United States Patent [19]

Fuller et al.

[11] Patent Number: 5,315,289
[45] Date of Patent: May 24, 1994

[54] ANTICIPATORY INTERACTIVE PROTECTIVE SYSTEM

[76] Inventors: Terry A. Fuller, 944 Morgan Rd., Rydal, Pa. 19046; Thomas Jennings, 5603 Benson Ter., Coloma, Mich. 49038

[21] Appl. No.: 834,445
[22] Filed: Feb. 12, 1992

Related U.S. Application Data

[63] Continuation-in-part of Ser. No. 760,649, Sep. 16, 1991.

[51] Int. Cl.$^5$ .............................................. G08B 23/00
[52] U.S. Cl. ................................. 340/532; 340/573; 340/679; 340/680; 340/686
[58] Field of Search ............... 340/573, 679, 680, 688, 340/532

[56] References Cited

U.S. PATENT DOCUMENTS

| | | | |
|---|---|---|---|
| 3,531,793 | 6/1967 | Shottenfeld | 340/528 |
| 3,873,804 | 3/1975 | Gordon | 219/147 |
| 3,891,980 | 6/1975 | Lewis et al. | 340/539 |
| 4,195,722 | 4/1980 | Anderson et al. | 192/131 R |
| 4,249,074 | 2/1981 | Zettler et al. | 250/221 |
| 4,598,275 | 7/1986 | Ross et al. | 340/825.31 |
| 4,603,327 | 7/1986 | Leonard et al. | 340/686 |
| 4,621,300 | 11/1986 | Summerer | 361/175 |
| 4,713,535 | 12/1987 | Rhoades | 250/221 |
| 4,767,922 | 8/1988 | Stauffer | 250/221 |
| 4,940,968 | 7/1990 | De Nood | 340/572 |
| 4,962,369 | 10/1990 | Close | 340/572 |
| 4,965,909 | 10/1990 | McCullough et al. | 17/21 |
| 4,972,198 | 11/1990 | Feltz et al. | 343/742 |
| 4,975,937 | 12/1990 | Horton et al. | 378/114 |
| 4,990,891 | 2/1991 | Reeb | 340/572 |
| 4,994,939 | 2/1991 | Rubertus et al. | 361/429 |
| 5,005,001 | 4/1991 | Cordery | 340/551 |
| 5,023,597 | 6/1991 | Salisbury | 340/572 |
| 5,025,175 | 6/1991 | Dubois, III | 307/326 |
| 5,030,941 | 7/1991 | Lizzi et al. | 340/572 |
| 5,043,702 | 8/1991 | Kuo | 340/539 |
| 5,051,726 | 9/1991 | Copeland et al. | 340/572 |
| 5,051,727 | 9/1991 | Fockens | 340/572 |

FOREIGN PATENT DOCUMENTS

| | | |
|---|---|---|
| 0346300 | 12/1989 | European Pat. Off. . |
| 0445860A2 | 9/1991 | European Pat. Off. . |
| WO89/0256 | 3/1989 | PCT Int'l Appl. . |
| WO91/1358 | 9/1991 | PCT Int'l Appl. . |

Primary Examiner—John K. Peng
Assistant Examiner—Edward Lefkowitz
Attorney, Agent, or Firm—Seidel, Gonda, Lavorgna and Monaco

[57] ABSTRACT

One or more sensors located on or surrounding a dangerous condition anticipate when an individual is approaching a hazard zone associated with the dangerous condition and then arms an alarm and activates an interactive protective system which protects an individual from exposure to the dangerous condition. The interactive system comprises a protective garment adapted to be worn by the individual. The protective garment includes a sensor for sensing when the protective garment is being worn and a signalling device responsive to the sensor for generating a signal indicating when the protective garment is being worn. A detector and control device responsive to the signal from the signalling device triggers an alarm sensible to the individual when it is activated by the motion sensor and does not sense the signal from the signalling device.

26 Claims, 11 Drawing Sheets

ANTICIPATORY INTERACTIVE PROTECTIVE SYSTEM

This application is a continuation-in-part of Ser. No. 07/760,649 filed 16 Sep. 1991.

FIELD OF THE INVENTION

The present invention relates to safety devices and systems and to interactive safety devices and systems that preclude operation of dangerous and potentially dangerous equipment, machinery and the like, or exposure to hazardous environments or toxic chemicals, in the absence of proper use of the safety devices.

In particular, it relates to the use of one or more proximity detectors, such as but not limited to motion detectors, to activate the protective system when the detector(s) anticipates that an individual is approaching a hazard zone associated with the dangerous condition.

BACKGROUND OF THE INVENTION

Many injuries occur or are made more severe because an operator of equipment is not wearing appropriate protective garments. Consequently, a means of insuring that an equipment operator wears appropriate protective garments would dramatically decrease both the number and severity of injuries. For example, there are over one million industrial eye injuries every year in the United States alone, and millions more in the rest of the world. Most of these injuries occur because workers do not wear eye protection such as safety glasses, goggles and face shields. This causes a great deal of unnecessary morbidity and psychological trauma to the injured and their families, and, in financial terms, is estimated to cost U.S. industry billions of dollars every year.

In addition to eye injuries, injuries to the extremities, especially the hands and fingers, occur with unnecessary frequency every year and add to the overall human and economic costs associated with industrial injuries.

Federal and local statutes have been enacted in an attempt to prevent industrial injuries from occurring. Protective eyewear and clothing is now required to be worn before operating machinery or exposing oneself to dangerous materials. Machines are designed with "intrusion detectors" to prevent injuries to hands and fingers. However, existing attempts to prevent industrial accidents do not offer a perfect solution to the problem. Machines with intrusion detectors may prevent injuries to the hand, but are still capable of ejecting flying debris that can injure the eye if the operator is not wearing proper eye protection. Even worse, devices like intrusion detectors can give an operator a false sense of security by lulling him into thinking that the intrusion detector alone is adequate protection when it is only a partial. Thus, other protective devices such as protective eyewear may be ignored, with potentially disastrous results. Moreover, existing Federal and local statutes and regulations are primarily aimed at requiring employers to provide safety equipment such as protective eyewear and protective clothing. However, even when given protective equipment, many workers simply forget or refuse to use it.

Garden equipment such as power edgers, weed cutters, and chain saws also contribute to the incidence of preventable accidents. Such accidents could be reduced or eliminated by appropriate protective garments.

Head injuries resulting from motorcycle accidents occur more frequently and more severely to motorcyclists who are not wearing protective helmets compared to motorcyclists who do wear helmets. Many states have enacted laws requiring motorcyclists to wear helmets, but such laws are difficult to enforce and are frequently ignored. Similar head injuries occur with bicycles, all-terrain-vehicles (ATVs), snow mobiles and like vehicles. Wearing helmets would prevent or reduce the severity of many such injuries.

The failure of operators of boats, jet skis, and other powered water-vehicles to wear life jackets or other floatation devices to prevent their drowning if incapacitated is another source of preventable injury.

Opening containers of, and using, toxic or caustic chemicals creates a potential for serious eye injuries, burns, and respiratory problems that could be virtually eliminated by wearing appropriate protective garments, such as goggles, face shields or hoods, protective suits, or respirators.

Similar paradigms exist for exposure to other dangerous environments, such as extreme (high and low) temperatures, exposed electrical conductors, radiation, oxygen-depleted atmosphere, excessive noise areas, high and low pressure areas and the like, all of which may be made less hazardous by wearing appropriate protective garments or devices. Further, even when protective garments or devices are used, their effectiveness is dependent upon their being worn or used in the proper manner.

Other dangerous conditions exist. For example, falls from scaffolding and other elevated structures and areas account for thousands of injuries and many needless death every year. Such accidents could be prevented or reduced by wearing safety harnesses, and by preventing access to elevated areas unless a workman is properly wearing the harness.

Handling and transportation of toxic chemicals is another circumstance which requires proper protection. Handling and transportation of toxic chemicals are dangerous activities, require much paperwork to insure that the chemicals are handled properly, and are not failsafe. Thus, workers can, at present, approach and handle toxic chemical containers and devices containing toxic chemicals without the appropriate protective equipment. This puts those workers at risk.

Additionally, the vast complexity of modern factories, such as chemical plants or nuclear plants, has made the task of evaluating the safety of performing new operations extraordinarily difficult. The problem is often compounded when, as is frequently done, subcontractors are employed. Because of their transient nature, subcontractors are often unfamiliar with the plant in which they find themselves working. A subcontract worker could inadvertently have access to and use of equipment in areas where use of that particular equipment should be prohibited. Such a dangerous condition is more likely to occur in a complex factory in which many unrelated systems exist in close proximity. While a worker may be safely working with one system, he might be creating, or exposed to, a hazard from an adjacent system. For example, repair operations using a torch may be approved for a warehouse with rapidly changing inventory. Between the time the repair procedure is approved and the time the repair work is actually performed, the warehouse may have received and be storing containers of flammable chemicals in the vicinity of the repair operations. Another possibility is that, as the repair job progresses, the repair job extends beyond the boundaries originally contemplated into an area where the use of a torch is dangerous. It is therefore desirable that certain tools, which may normally not be unreasonably dangerous to use but could be hazardous when used in certain areas or in certain environments, be equipped with a means of signalling their presence to one or more detectors in such areas or environments, so that an appropriate alarm may be sounded to alert workmen and others of a potential hazard situation.

There is thus a need for a protective system to protect an individual from exposure to dangerous conditions associated with machinery or other hazards which makes it impossible for the individual to operate the machinery or be exposed to the hazard without wearing the necessary protective equipment, or without wearing such equipment in the proper manner. The present invention fulfills that need.

SUMMARY OF THE INVENTION

The present invention is directed to an interactive protective system to protect an individual from exposure to a dangerous condition such as, but not limited to, a dangerous condition associated with the operation of equipment. In broad terms, the invention comprises a protective garment or device which includes sensor means for sensing when the protective garment or device is being worn, signalling means responsive to the sensor means for generating a signal indicating that the protective garment or device is being worn, detector means responsive to the signal from the signalling means, and control means responsive to the detector means for preventing exposure of the individual to the dangerous condition in the absence of the proper signal. The signalling means may be either a passive or an active signalling means. In an alternative embodiment, the control means may prevent exposure by triggering an alarm sensible by the individual and others in his vicinity.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE INVENTION

Figure 1:
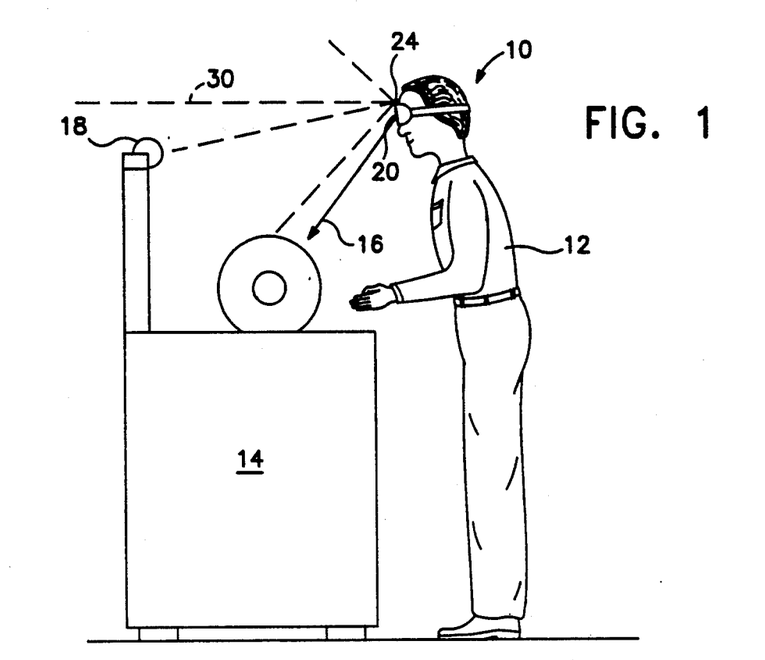
FIG. 1 is a simplified diagram, in side elevational view, of an interactive protective system according to the invention in an application utilizing a piece of metal working machinery such as an abrasive-wheel grinder.
Figure 2:
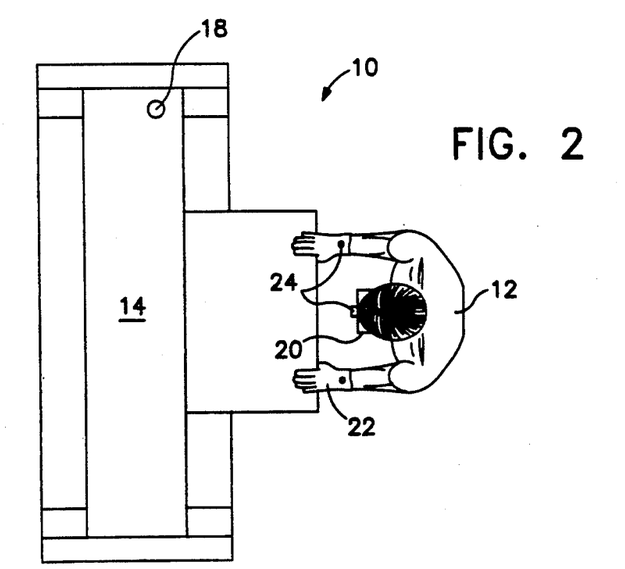
FIG. 2 is a simplified diagram, in top plan view, of a an alternative form of interactive protective system in an application utilizing a piece of sheet metal working machinery.

Referring now to the drawings, wherein like numerals indicate like elements, there is shown in FIG. 1 a side elevational view of an interactive protective system 10 in accordance with the present invention. System 10 is shown in conjunction with a human operator 12 and an item of equipment 14. Equipment 14 will be understood to be an item of equipment with which a dangerous condition is associated. For example, equipment 14 may comprise a machine tool such as grinder as in FIG. 1, a sheet metal brake as in FIG. 2, a saw or a similar item of equipment which has the potential to injure a limb or to generate flying debris such as wood or metal chips 16.

Figure 3:
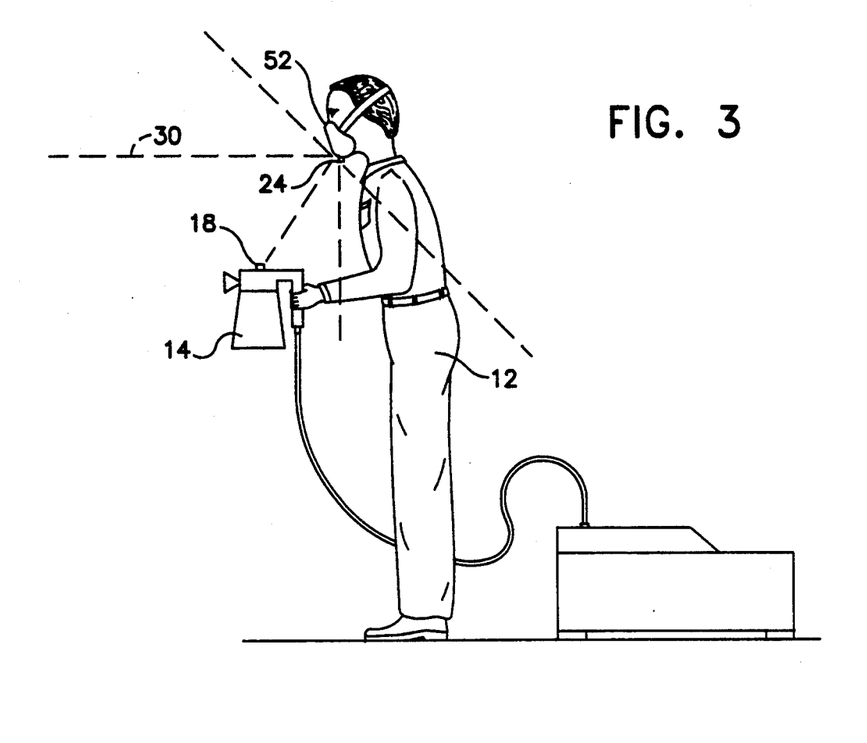
FIG. 3 is a simplified diagram, in side elevational view, of an alternative form of interactive protective system in an application utilizing a paint spraying apparatus.
Figure 4:
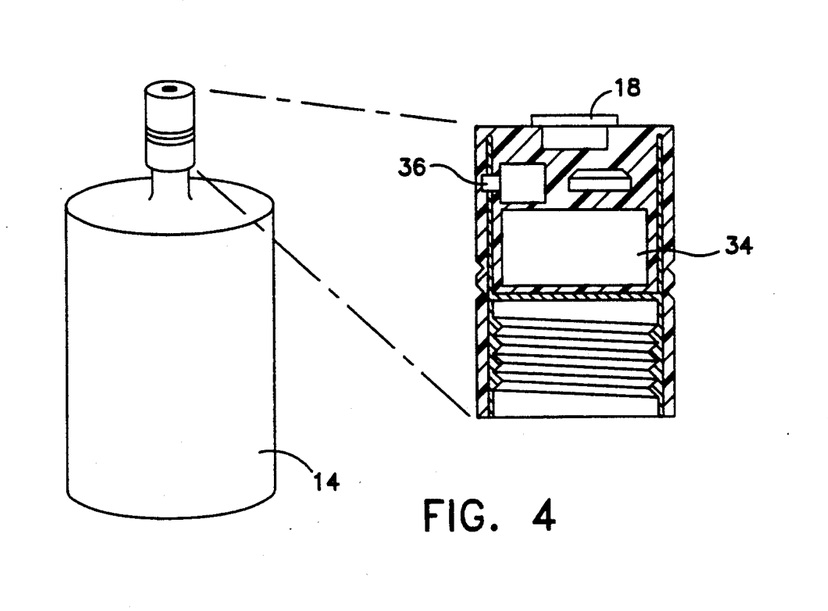
FIG. 4 is a simplified diagram, in side elevational view and partial section, of an alternative form of interactive protective system in an application utilizing a hazardous chemical container.
Figure 5:
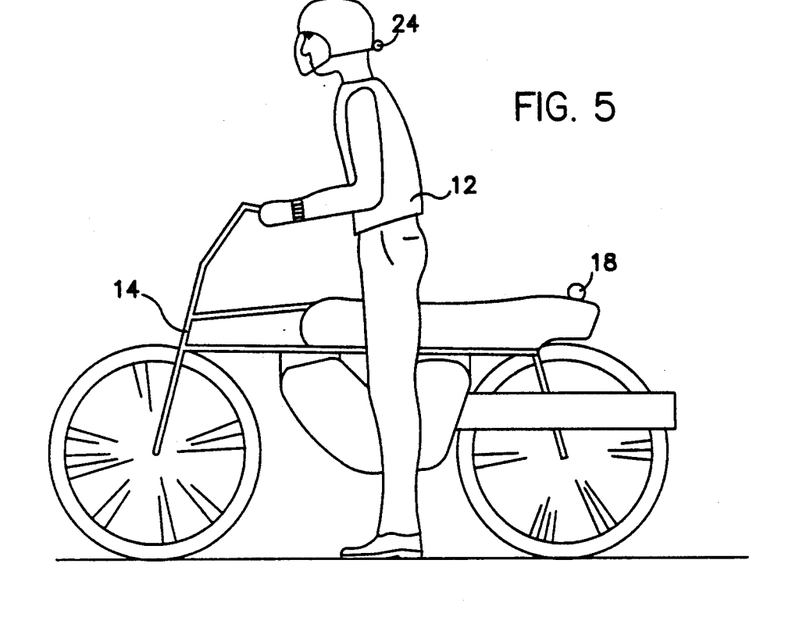
FIG. 5 is a simplified diagram, in side elevational view, of an alternative form of interactive protective system in an application utilizing a motorcycle.
Figure 6:
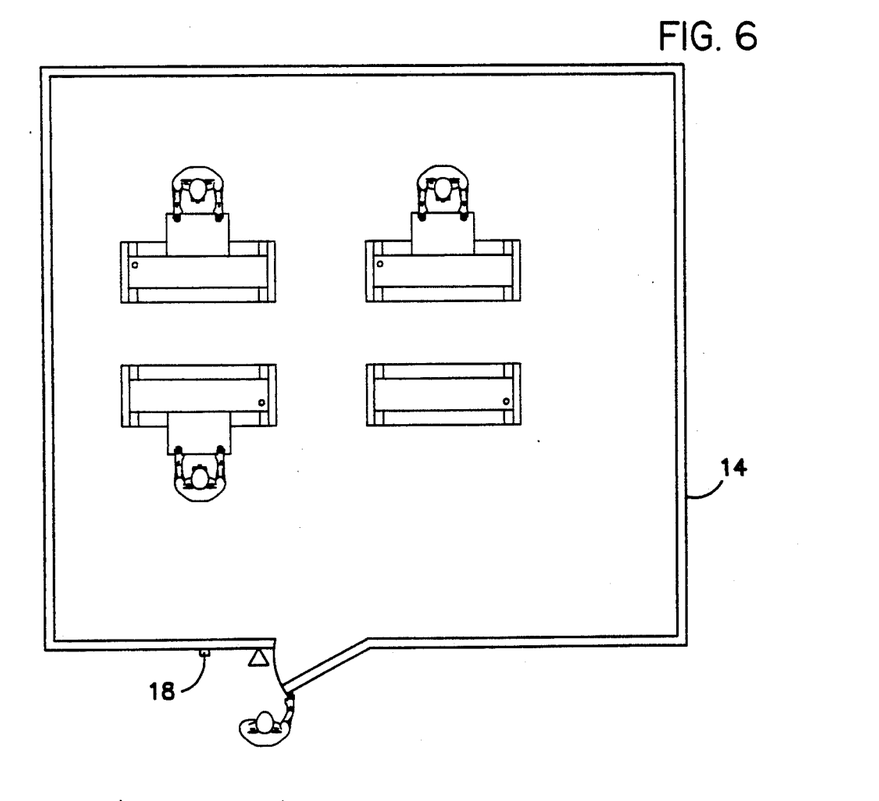
FIG. 6 is a simplified diagram, in top plan view, of an alternative form of interactive protective system in a system utilizing a work room wherein machinery create an ambient hazard.
Figure 7:
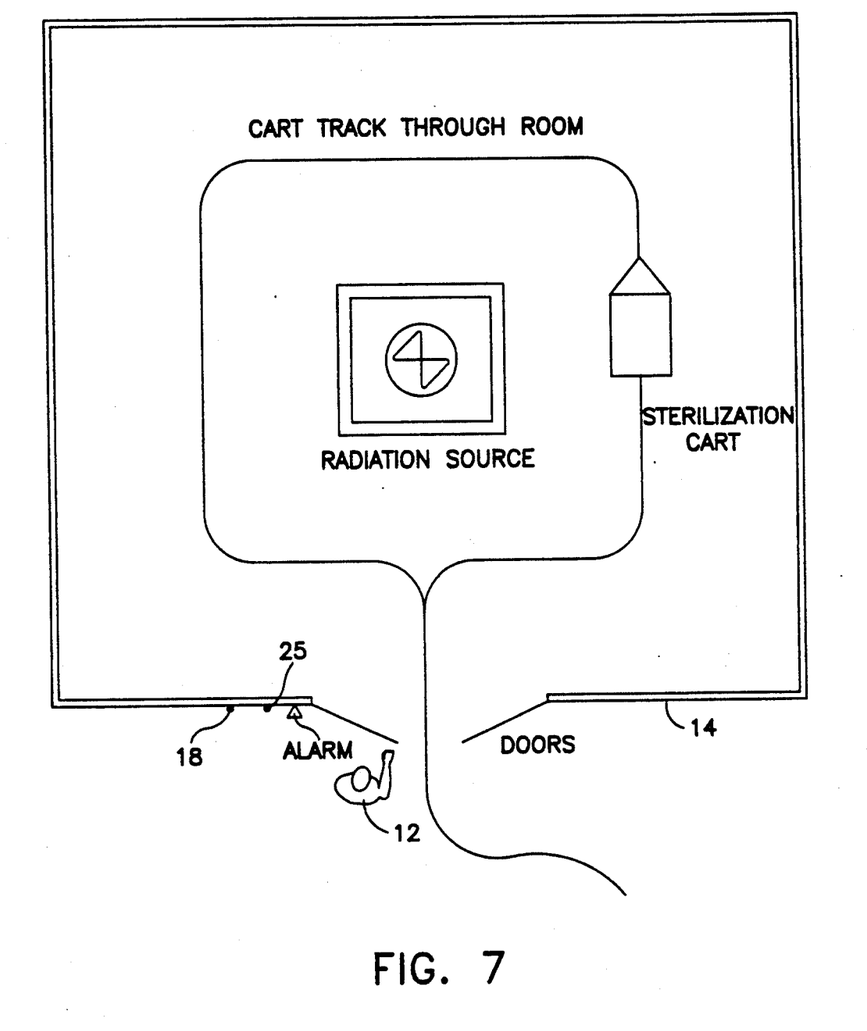
FIG. 7 is a simplified diagram, in top plan view, of an alternative form of interactive protective system in a system utilizing a closed area in which there is an environmental hazard such as a radiation source, and with an alarm feature which may be part of the invention.

Alternatively, equipment 14 may be an item of equipment such as a paint or solvent sprayer which emits dangerous vapors as shown in FIG. 3. Equipment 14 may be a container of caustic or toxic material as shown in FIG. 4. Equipment 14 may be a garden tool such as a lawn mower, chain saw, weed cutter and the like, or may be a vehicle such as a motorcycle as shown in FIG. 5, or an ATV, boat, jet ski, or the like. Equipment 14 may be or be in an area as shown in FIG. 6 which presents the danger of noise, electrical shock or of hazardous optical or other electro-magnetic radiation (such as ultraviolet, infrared, microwave, gamma or other nuclear radiation) as shown in FIG. 7. Equipment 14 may be a hazardous environment, including extreme cold, heat, height (danger of falling), low or high pressure area, or other extreme atmospheric environment. As the principles of operation are essentially identical for the various embodiments, the more detailed description which follows is directed primarily to the machinery application depicted in FIGS. 1 and 2.

Thus, as used herein, the term "equipment" is intended to be construed broadly as encompassing not only such things as machinery and tools, but also such things as hazardous locations and areas, as well as combinations of the two whereby dangerous machinery may be located in a hazardous area. In keeping with a broad definition of "equipment," the terms "render inoperative," "shut off" and the like are intended to be construed broadly as encompassing not only the deactivation of machinery and power tools, but also as encompassing the prevention, termination or cessation of a dangerous condition or environment in order to render a hazardous location or area no longer unsafe, and either the preclusion of an individual from the hazardous location/area or the warning by a sensible alarm of the individual and those in his vicinity, or both preclusion and alarm, in order to prevent the individual from being exposed to the hazard in the first place.

Equipment 14 is provided with a detector 18 for detecting a signal from one or more safety garments worn by operator 12, such as safety eyewear 20, gloves 22 or other safety wear such as, but not limited to, respirators, ear protectors, safety harnesses, boots, coveralls, and so forth. It should be understood that this list is illustrative and that the invention is not limited to specific safety garments. Each safety garment such as eyewear 20 and gloves 22 includes a signal source 24 which radiates a signal 30 that is detected by detector 18. Signal source 24 emits either acoustic (i.e., sonic or ultrasonic) or electromagnetic including optical radiation and is preferably powered by a small battery or solar cell in the safety garment itself. Preferably, the signal source 24 on a safety garment is not activated, and does not transmit any signal, unless and until it is worn by the operator. For that purpose, the safety garment may be activated by one of several means. The transmitter (signal source) may be activated by a manually-operable device such as a switch that is actuated only by the deliberate action of the operator. Alternatively, the transmitter may be activated automatically. Automatic means for activating the transmitter can include an embedded electro-mechanical switch that is activated by contact with the body, or an electro-magnetic energy reflectometer or proximity detector. Automatic activation has the added advantage of conservation of the power source (i.e., the battery) in the garment, and, even more important, does not require the operator to remember to activate the safety device, thus further reducing the hazard potential. Such automatic activation could also derive from the hazardous environment itself, such as salt water activated batteries or power cells used in life preserver vests or other floatation devices which are intended for use around seawater.

In addition, sensors can be arranged in such manner that activation is contingent upon appropriate use of the device. For example, an infrared ophthalmic reflectometer could be used to determine if protective goggles or other eye protection is properly worn, rather than merely being in the proximate area. Gloves with sensors in the distal finger portions, weight or temperature sensors in boots, helmets or protective suits, are additional examples of the sensor being activated only when the protective garment is worn or used in the proper manner. A respirator (see FIG. 3, item 52) could be fitted with a carbon dioxide sensor to insure that it is properly placed over the nose and mouth; ear protectors could be equipped with proximity sensors.

The signal 30 from the signal source 28 may be virtually any type of signal. A beam of infrared (IR) or visible energy, such as from a laser diode, light-emitting diode (LED) or other IR or visible source is convenient and easy to implement. An IR or visible source can provide either a highly directional or a widely diverging signal. Other signal ranges of the electromagnetic spectrum may be used. In addition to electromagnetic radiation, the transmitter may generate a beam of ultrasonic energy, providing a generally diverging signal. Similarly, signal 30 may be a radio frequency (RF) signal, providing a generally diverging signal.

Whether the signal from the transmitter is highly directional or widely diverging is a factor in determining the permissible range of movement of the operator 12. A highly directional beam will restrict the operator to a narrow range of movement with respect to equipment 14, whereas a generally diverging beam will permit a generally wider range of operator position with respect to the equipment.

The signal from signal source 24 may be continuous wave (CW), pulsed, or modulated CW or modulated pulsed, or any combination thereof. This gives signal source 24 the ability to transmit an individualized signal as desired. It also provides the ability for the system to distinguish between valid transmitter signals and ambient signals from sources other than the transmitter. It further provides the ability to have multiple safety garments simultaneously working in close proximity to each other without interference.

Whatever the type of signal emitted by signal source 24, the equipment will have appropriate detector means to detect the signal, and control means responsive to the detector means for preventing exposure of the individual to the dangerous condition in the absence of the proper signal. In most of the depicted embodiments, the control means prevents exposure by inhibiting or terminating the operation of the equipment or by not permitting access to it; however, in an alternative embodiment, the control means may prevent exposure by triggering an alarm sensible by the individual and others in his vicinity. This later embodiment may be seen in FIG. 7. Equipment 14 in this situation is exemplified by an area where items are sterilized by radiation, being placed on a cart which is moved without human assistance along a track. A human operator 12 is depicted attempting to enter the area without a protective garment which provides radiation shielding. Since it may not be possible or practical to inhibit the radiation source from emitting radiation, and since the access doors must open in the normal course of operation to permit entry and exit by the cart, the control means prevents exposure by triggering an alarm, such as a flashing light or siren, which is sensible by the individual and others in his vicinity. Alternatively, an alarm may be armed by one or more proximity detectors such as but not limited to directional motion detectors 25 oriented to detect motion toward or other positional change relative to the access doors, and triggered by the control means. Thus, whenever motion toward the doors is not accompanied by a signal from source 24 which indicates that the moving figure is wearing an appropriate protective garment or equipment, the alarm will sound. It will be apparent that in other embodiments the control means can both trigger an alarm and inhibit or terminate the operation of the equipment or not permit access to it.

Figures 8, 11:
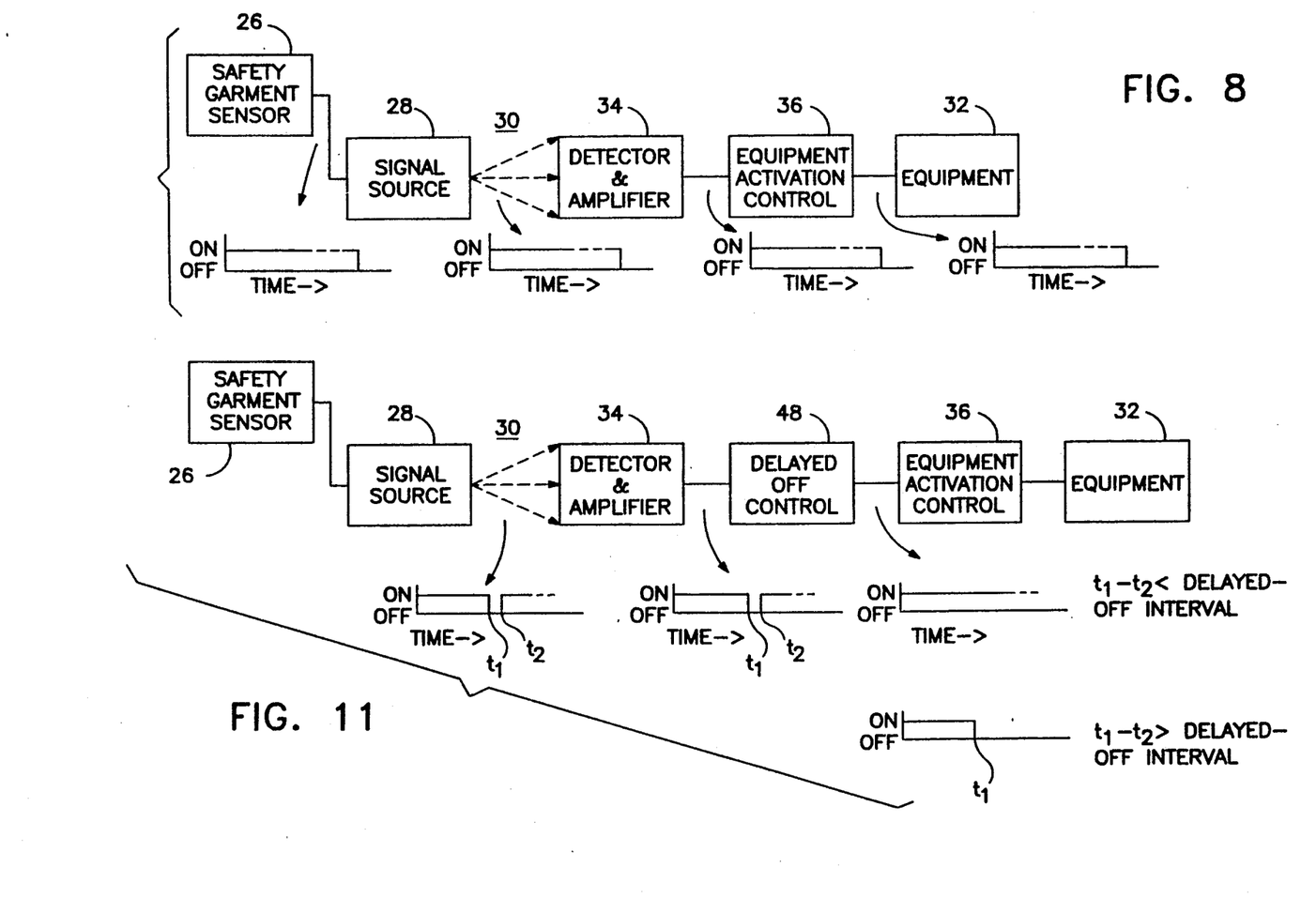
FIG. 8 is a simplified block diagram of the invention.
FIG. 11 is a block diagram of a delayed-off feature which can be part of the invention.

The basic system according to the invention is illustrated in block diagram form in FIG. 8. A safety garment sensor 26 senses when the garment, such as eyewear 20, gloves 22 or other safety wear, are properly worn by an operator, and generates an "ON" signal which is fed to the Signal Source 28. Signal Source 28 in FIG. 8 corresponds to the signal source 24 already illustrated and described. When the Signal Source 28 receives the ON signal from the sensor 26, it begins to transmit a signal, labeled 30, indicating that the protective garment is being worn. As the operator wearing the garment approaches the equipment, labeled 32 in FIG. 8, the associated detector, labeled "Detector & Amplifier" 34 in FIG. 8, detects the signal. In response to the detected signal, Detector & Amplifier 34 generates an "ON" signal, which is fed to Equipment Activation Control circuitry 36. In response to the ON signal from Detector & Amplifier 34, Equipment Activation Control circuitry 36 generates an "ON" signal to equipment 32 to permit its activation. Such activation can be automatic or require human operator confirmation in order to initiate activation.

Figure 9:
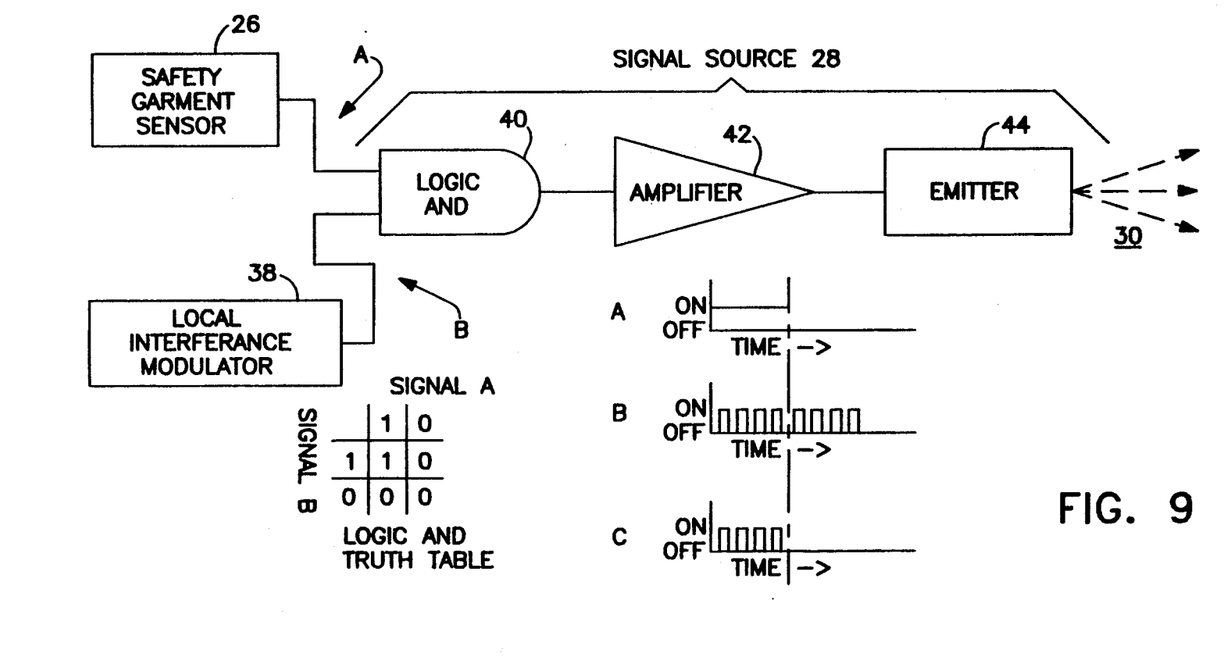
FIG. 9 is a block diagram of the signal source of FIG. 3 in more detail.

One form of signal source 28, which generates a pulsed output, is illustrated in FIG. 9. In the apparatus illustrated in FIG. 9, a local interference modulator 38 generates a pulse pattern labeled B in FIG. 9. The pulse pattern B and the ON signal (labeled A) from the garment sensor 26 form the inputs to a logic AND circuit 40. As those skilled in the art will know, logic AND circuits operate in accordance with the truth table shown in FIG. 9. Thus, pulses from pulse pattern B will be output from AND circuit 40 only when the ON signal from the sensor 26 is present at the input to the AND circuit 40, as indicated by the pulse pattern C in FIG. 9. The output from AND circuit 40 is then amplified by amplifier 42 and fed to an emitter 44. Emitter 44 generates the signal 30 already described. By selecting specific modulation patterns for the modulator 38 associated with a particular safety garment or garment type, the signal from the source 28 can be made unique to the garment or garment type, allowing multiple safety garments to work simultaneously in close proximity to each other.

Figure 10:
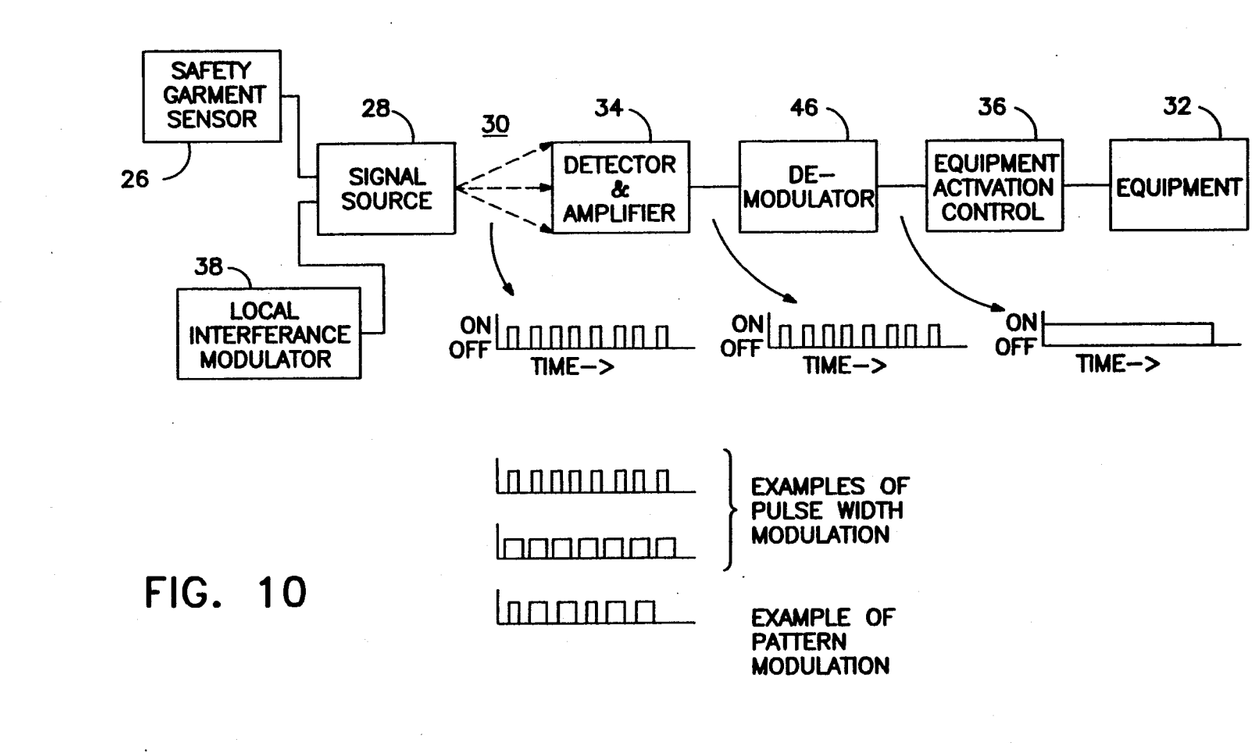
FIG. 10 is a block diagram of a modulation encoding feature which can be part of the invention.

A system according to the invention using a modulated pulse signal coding and decoding technique is illustrated in FIG. 10. The elements of the system in FIG. 10 which are labeled with the same reference numerals as corresponding elements in FIGS. 8 and 9 are the same and perform the same functions. In addition to those elements, the system illustrated in FIG. 10 includes a demodulator 46 which decodes the modulation pulses detected by the Detector and Amplifier 34 from signal 30 and generates, in response, an ON signal to the Equipment Activation Control circuitry 36. The local interference modulator 38 and demodulator 46 work in concert to insure proper detection of the correct safety garment. This mechanism provides a means of identification of a specific garment or a class of garments.

FIG. 11 illustrates a system according to the invention which employs a delayed-off circuit 48. The elements of the system in FIG. 11 which are labeled with the same reference numerals as corresponding elements in FIGS. 8, 9 and 10 are the same and perform the same functions. In addition to those elements, the system illustrated in FIG. 11 includes a delayed-off control 48 between detector 34 and Equipment Activation Control circuitry 36. In some instances, it may be desirable to delay shutting off equipment 32 if there is a momentary interruption in signal 30, such as caused by the operator briefly moving his body or turning his head. In those cases, delayed-off control 48 provides for an adjustable delay between the time the signal 30 is interrupted and the time a loss of signal is transmitted to the Equipment Activation Control 36 to cause the equipment to turn off. The delayed-off control 48 continues sending the appropriate signal to the Equipment Activation Control 36 during the delay. If the signal 30 is again detected by the Detector and Amplifier 34 before the end of the delay period, the delayed-off control 48 continues without interruption, and no equipment shutoff occurs. However, if the end of the delay period is reached and there is no signal 30 being detected by detector 34, the delayed-off control 48 will cease sending the appropriate signal to the Equipment Activation Control 36, and the Equipment Activation Control circuitry will shut off equipment 32.

The delayed-off control is also likely to be used in conjunction with alarm warning systems such as previously described with reference to FIG. 7. Where entry or approach to a hazardous area or container is detected by motion detector or proximity sensor, and an alarm is sounded if the entering motion or increased proximity is not accompanied by a signal 30, it would be preferred that a transitory interruption or loss of signal 30 not cause spurious alarms. Thus, in such systems the alarm activation may be delayed by the delayed-off control 48 for an interval appropriate to eliminate spurious alarms.

Figure 12:
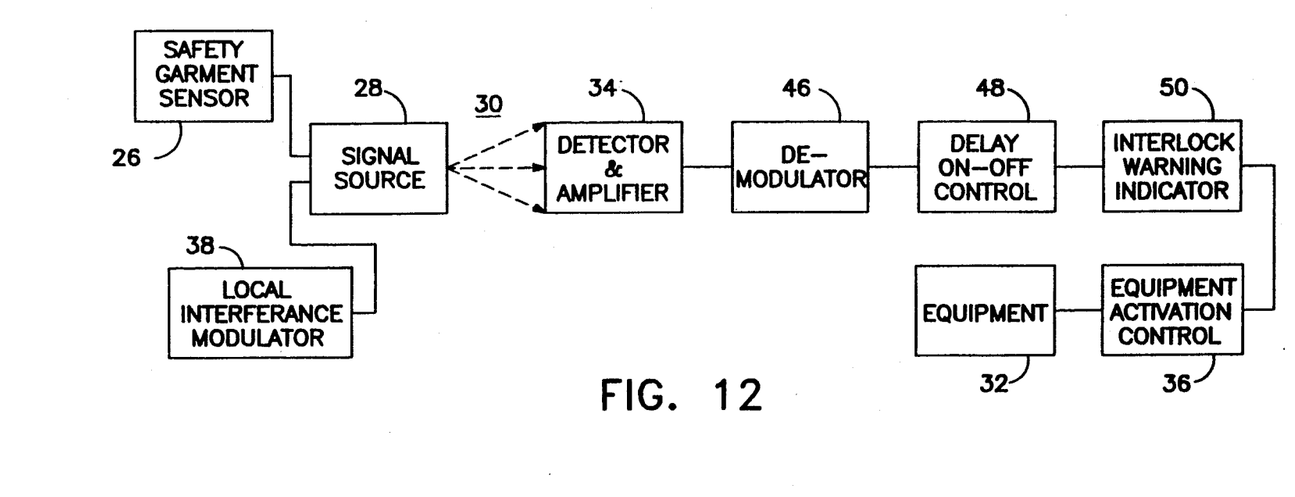
FIG. 12 is a block diagram of the invention as shown in FIG. 8, and including the modulation encoding and a delayed-off feature.

FIG. 12 illustrates a system which incorporates local interference modulator 38 and delayed-off control 48, and adds an Interlock Warning Indicator 50. The Interlock Warning Indicator 50 is located between the delayed-off control 48 and Equipment Activation Control circuitry 36, and is intended to warn an operator that the equipment is about to shut off so that he can take appropriate action if he wishes to avoid the shutoff.

Figure 9A:
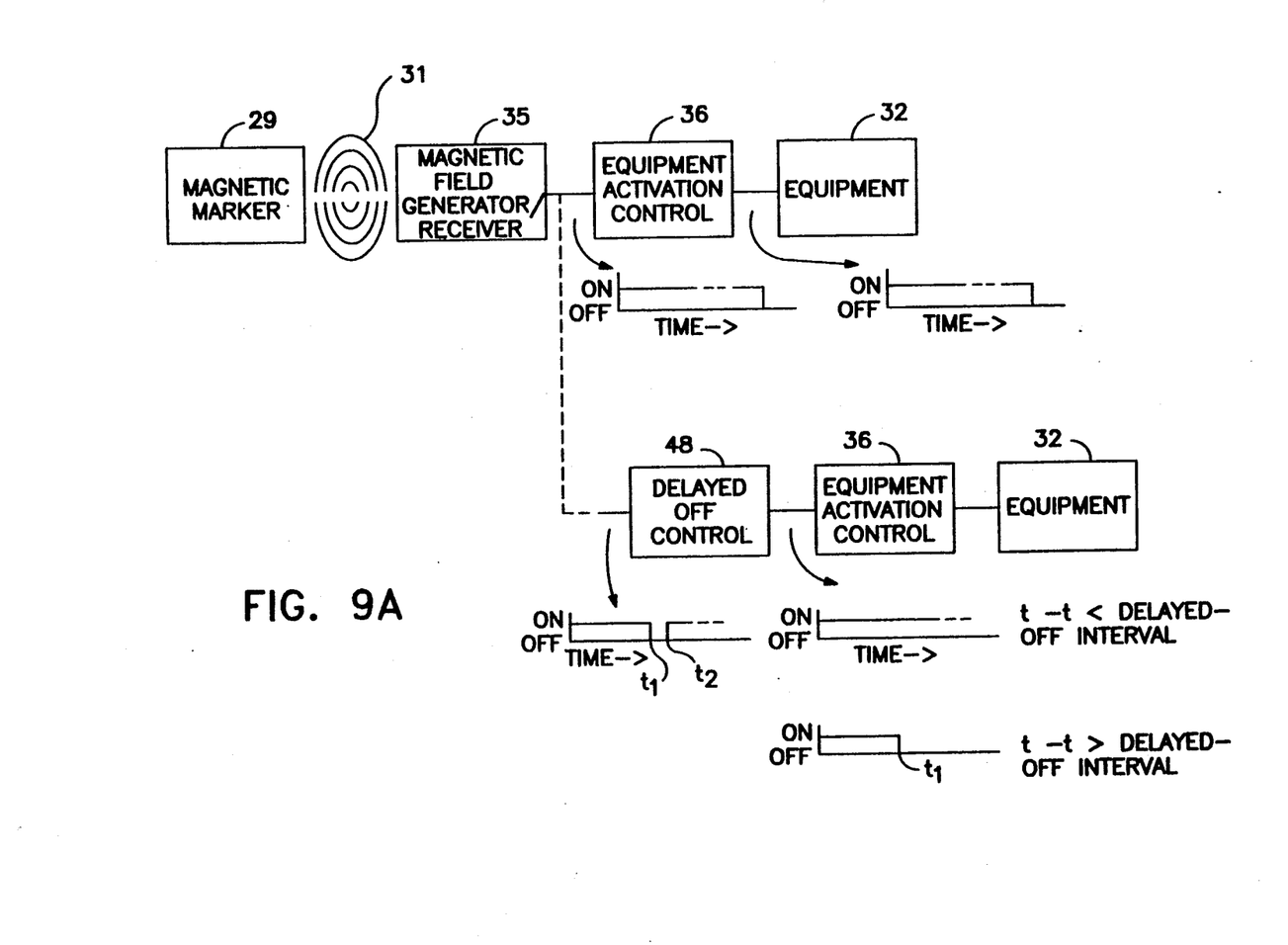
FIG. 9A is a block diagram of an alternate embodiment of the invention, illustrating the use of a passive sensing system where a safety garment carries a passive detection element instead of an active element.

There may be situations where it is desirable not to use an active source to generate a signal 30 to the Detector and Amplifier 34. For example, there may be instances where it is difficult or impossible to change batteries in the safety garment. Likewise, it may be desirable not to risk injury which might result if a battery were to run down just prior to or during use. In such cases, it is preferable to use a passive element on the safety garment which interacts with an active element powered by the equipment 14. A system of this type is illustrated in FIG. 9A. The system illustrated in FIG. 9A is similar to the system illustrated in FIG. 8, and uses some of the same components, which retain the same reference numerals. However, the system of FIG. 9A differs from that of FIG. 8 in that active signal source 28 and Detector and Amplifier 34 have been replaced with a passive magnetic marker 29 and a magnetic field generator/receiver 35. Marker 29 and magnetic field generator/receiver 35 are known per se, and are commonly used in retail stores to prevent removal of marked merchandise from the store by triggering an alarm if the marked merchandise is attempted to be carried past a field generator/receiver. Accordingly, those components need not be described here in detail.

As will be understood by those skilled in the art, the magnetic marker 29 is located on the safety garment and the magnetic field generator/receiver 35 is located on or adjacent the equipment 14 as may be necessary. The magnetic field generator/receiver 35 is positioned such that when the magnetic marker 29 is moved to a location within the magnetic field 31 generated by magnetic field generator/receiver 35, the magnetic marker alters magnetic field 31. The alteration of the magnetic field due to magnetic marker 29 causes magnetic field generator/receiver to generate an output signal, similar to the output signal generated by Detector and Amplifier 34. In similar fashion, the output signal from magnetic field generator/receiver 35, indicating the presence or absence of a required safety garment, is applied directly to Equipment Activation Control 36 if no delayed-off control is desired, or to Delayed-Off Control 48 is the delayed-off control feature is desired.

It should be understood that, with respect to all of the block diagrams of FIGS. 8 through 12, all of the individual elements of the system are conventional and well known to those skilled in the art, and need not be described in detail. For example, any well-known circuit for generating a delay can be used as delayed-off control 48, and any pulse pattern generator may be used as the local interference modulator 38. The exact implementation of any of the individual elements of the invention is not crucial, and any convenient implementation of the circuitry is within the scope of the invention.

Figure 13:
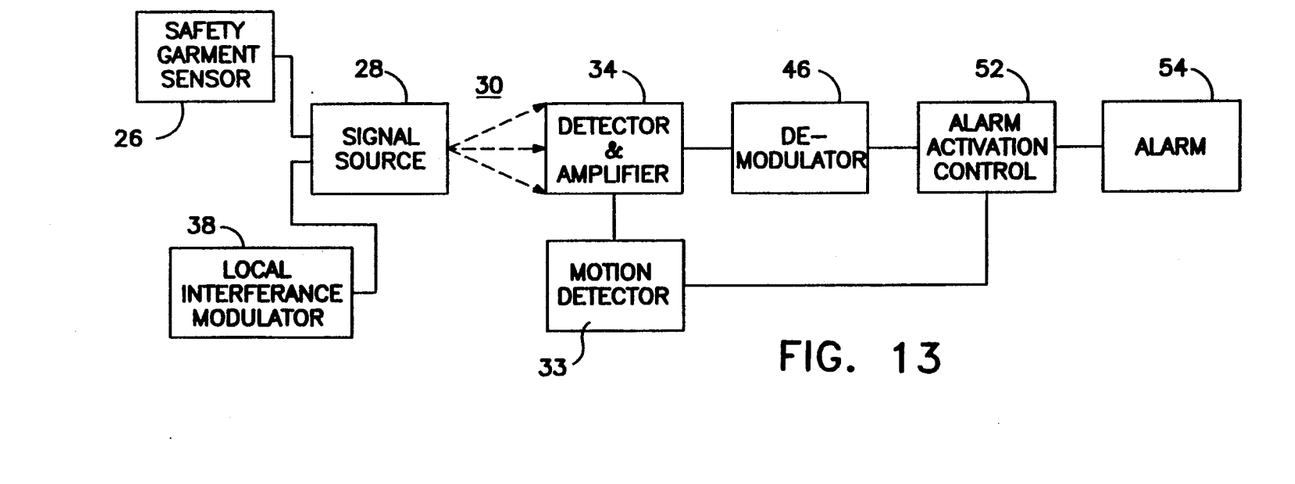
FIG. 13 is a block diagram of an alternate embodiment utilizing a proximity detector to arm an alarm and simultaneously activate the signal detector.
Figure 14:
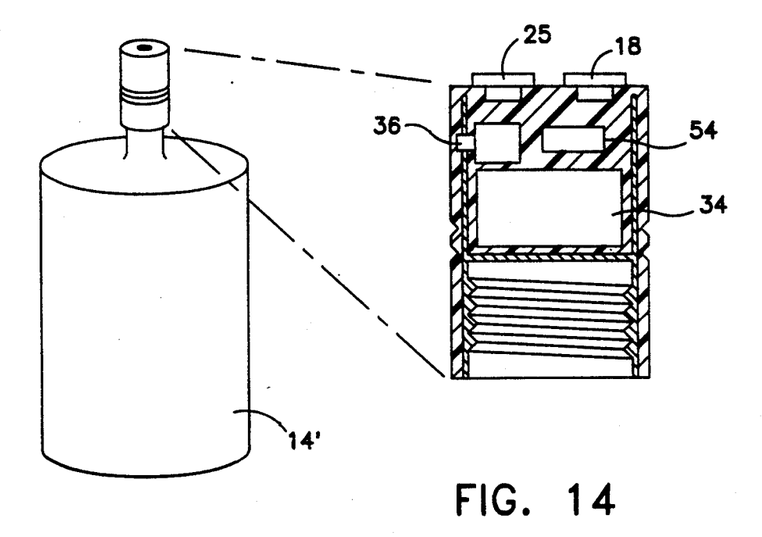
FIG. 14 is a simplified diagram, in side elevational view and partial section, of a hazardous chemical container equipped with either a motion or proximity detector as well as a safety garment sensor.

FIG. 13 depicts another embodiment of the invention in which a detector 33, which may be either a motion or a proximity detector, is used to activate the Detector and Amplifier 34 and simultaneously arm an activation control 52 for a sensory alarm 54. This embodiment differs from the previous embodiments in that the Detector and Amplifier does not need to be constantly activated whenever the equipment is running or the hazardous condition exists; instead, it is activated only when detected motion or increasing proximity indicates that a person is approaching a zone of hazard. For example, a toxic chemical container may be stored for prolonged periods without handling. The container 14' may be provided with a proximity or motion detector 25, as shown in FIG. 14, coupled to a sensory alarm 54 such as a siren or lights to warn a person who approaches too closely of the potential danger posed by the contents of the container. However, properly protected workers should be able to approach or handle the containers without triggering the alarm.

The motion or proximity detector can activate the alarm directly. Alternatively, as shown in FIG. 13, the motion or proximity detector 33, instead of activating the alarm directly, activates the Detector and Amplifier 34 and simultaneously arms the activation control 52 for the alarm 54. The activation control then acts as a logic gate which directs power to the alarm only if no signal is being received from the Detector and Amplifier 34, i.e., only if the canister 14' is being approached by someone not wearing the proper safety garments. If the approaching individual is wearing the proper safety garments, then, of course, the output signal from Detector and Amplifier 34 will inhibit alarm activation control 52, and no alarm will be given. A delay device similar to the delayed-off feature described with relation to the other embodiments may be used to prevent transient signal interruptions from causing spurious alarms.

It will be understood by those skilled in the art that the Detector and Amplifier 34 need not be activated only when the motion detector 33 senses someone approaching the canister 14' or some other hazardous area. If so desired, Detector and Amplifier 34 may remain constantly energized. However, energy savings can be achieved by activating Detector and Amplifier only when someone is approaching the canister or other hazardous area. Thus, if so desired, the Detector and Amplifier 34 can be decoupled from the alarm circuit.

It will also be understood that canister 14' may be equipped with a plurality of safety garment sensors as desired, so that it can be determined whether multiple required safety garments, such as gloves, goggles, etc., are being properly worn. Thus, as previously described, different frequencies, types of radiation (e.g., RF and infrared) and types of sensors can be used so that multiple garments can be simultaneously detected.

Figure 15:
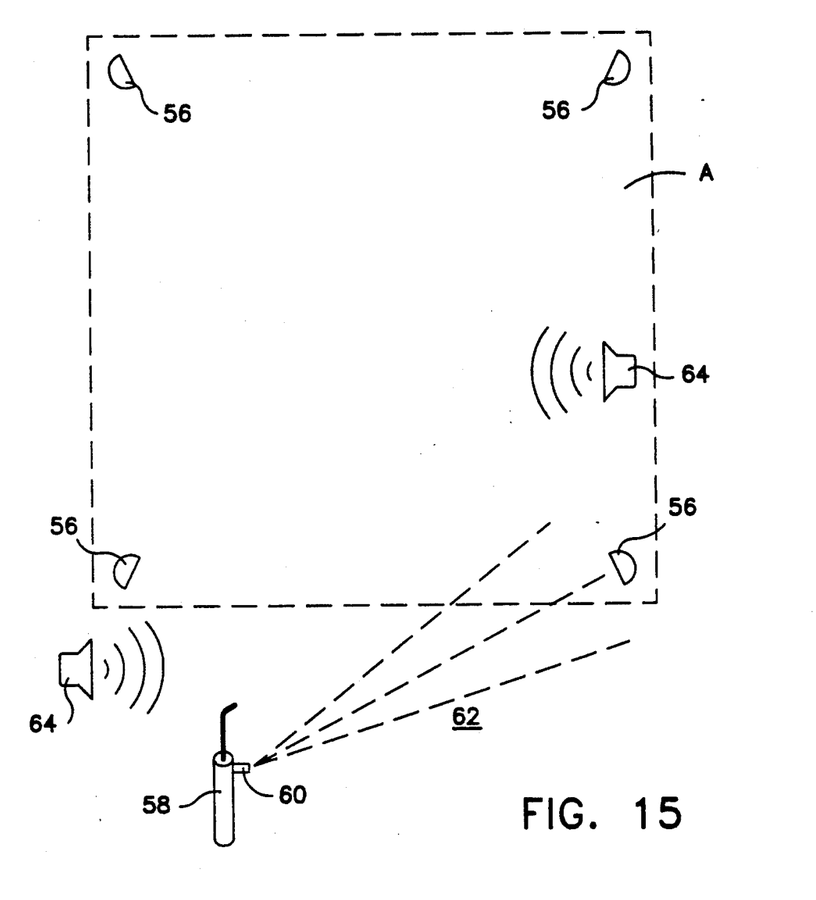
FIG. 15 is a simplified diagram illustrating the placement of a detector in an area where certain tools are prohibited to detect the presence of such tools and sound an alarm when the presence of such tools is detected.

Referring last to FIG. 15, there is shown in that figure at least one detector 56, which may be similar to Detector and Amplifier 34 as already described, located in an area A in which there may be the presence of a potentially unsafe condition, such as an area where flammable gases, vapors or other materials may be present. While the presence of flammable materials is not necessarily hazardous per se, the area can become very hazardous if an open flame or a spark were to occur in the area. For example, static electricity can cause sparks which can ignite flammable materials. This is a particular hazard in hospital operating rooms, which contain flammable gases, such as gaseous anesthetics. Ignition of flammable material can also be caused by tools which get very hot. Thus, tools that create a high temperature, such as a soldering iron, or an open flame, such as torch 58, or which can generate electrical or mechanical sparks, are fitted with a signal source 60, such as signal source 28 as previously described. The signal source 60 can be activated automatically, as described above in connection with signal source 24 on a safety garment. When the tool such as torch 58 is brought into or near the potentially hazardous area A, detector 56 will detect the signal 62 being emitted from signal source 60, and will activate an alarm 64, such as alarm 54 already described, in time to prevent the tool from being used unsafely. If desired, a network of detectors 56 can be employed to provide a "neutral zone" around a hazardous area to provide advance warning that a prohibited tool is about to be brought into a potentially hazardous area before the area is actually entered. Also, if the prohibited tool is a power tool, detector 56 can be used to deactivate electrical power in the area so that the tool cannot be operated, in the manner of preventing the activation of power equipment as already described above in connection with FIG. 8, for example.

The same approach applies to situations where it would be dangerous to introduce incompatible materials, such as chemicals, into the same area. In such a case, the containers for the chemicals can each be fitted with a signal source 60, or only the container for the prohibited material can be fitted with a signal source. Thus, for example, a container of a flammable material can be fitted with a signal source that would trigger the alarm if it were brought near an area with a high-oxygen atmosphere or an area in which incompatible materials is located.

An advantage to this last embodiment of the invention is that a safety officer can evaluate an entire factory area by area, and predefine areas where certain activities should be permanently prohibited. Inadvertent or unauthorized movement of tools and other work activity into a prohibited area will be detected and an alarm will sound.

The present invention may be embodied in other specific forms without departing from the spirit or essential attributes thereof and, accordingly, reference should be made to the appended claims, rather than to the foregoing specification, as indicating the scope of the invention.

We claim:

1. An interactive protective system to protect an individual from exposure to a dangerous condition, comprising a protective garment adapted to be worn by the individual, the protective garment including sensor means for sensing when the protective garment is being properly worn and signalling means responsive to the sensor means for actively generating a signal indicating that the protective garment is being properly worn, the system further comprising detector means responsive to the signal form the signalling means for detecting the signal, at least one sensor separate from the protective garment and responsive to positional change relative to the dangerous condition for arming an alarm, and control means responsive to the detector means for activating said armed alarm in the absence of detection of the signal.

2. A system according to claim 1, wherein the dangerous condition results from a hazardous environment and the sensor senses positional change toward the hazardous environment.

3. A system according to claim 1, wherein the signalling means comprises an active source of radiation.

4. A system according to claim 3, wherein the signalling means further comprises means for modulating the radiation in a modulation pattern selected to identify a specific protective garment which may be used in close proximity to other protective garments of the same type.

5. A system according to claim 4, wherein the signalling means further comprises means for modulating the radiation in a modulation pattern selected to identify a specific type of protective garment which may be used in close proximity to other types of protective garments having a similar interactive protective system but modulated with a different pattern.

6. A system according to claim 1, further comprising means for precluding, for a preselected time delay, the control means from triggering the alarm following interruption of the detector means from detecting the signal.

7. A system according to claim 6, further comprising means for precluding the control means from triggering the armed alarm if, following said interruption, the detector means begins detecting the signal prior to expiration of the delay.

8. A system according to claim 1, wherein the sensor responsive to positional change comprises a magnetic field generator/receiver.

9. A system according to claim 8, further comprising magnetic means on said protective garment for interacting with said magnetic field generator/receiver.

10. An interactive protective system to protect an individual from exposure to a dangerous condition comprising a protective garment adapted to be worn by the individual, the protective garment including sensor means for sensing when the protective garment is being properly worn and signalling means responsive to the sensor means for actively generating a signal indicating that the protective garment is being properly worn, the system further comprising at least one sensor separate from the protective garment and responsive to positional change relative to the dangerous condition for arming an alarm and for activating a detection and control means, said detection and control means being responsive to the signal and operatively associated with the alarm for activating the armed alarm only when the detection and control means does not detect the presence of the signal.

11. A system according to claim 10, wherein the dangerous condition results from a hazardous environment and the sensor senses positional change toward the hazardous environment.

12. A system according to claim 10, wherein the signalling means comprises an active source of radiation.

13. A system according to claim 12, wherein the signalling means further comprises means for modulating the radiation in a modulation pattern selected to identify a specific protective garment which may be used in close proximity to other protective garments of the same type.

14. A system according to claim 13, wherein the signalling means further comprises means for modulating the radiation in a modulation pattern selected to identify a specific type of protective garment which may be used in close proximity to other types of protective garments having a similar interactive protective system but modulated with a different pattern.

15. A system according to claim 10, further comprising means for preventing, for a preselected time delay, the detection and control means from activating the armed alarm following interruption of detecting the signal.

16. A system according to claim 15, further comprising means for preventing the detection and control means from activating the armed alarm, if following interruption of detecting the signal, the detection and control means begins detecting the signal prior to expiration of the delay.

17. A system according to claim 10, wherein the sensor responsive to positional change comprises a magnetic field generator/receiver.

18. A system according to claim 17, further comprising magnetic means on said protective garment for interacting with said magnetic field generator/receiver.

19. An interactive protective system to protect an individual from exposure to a dangerous condition, comprising a protective garment adapted to be worn by the individual, the protective garment including sensor means for sensing when the protective garment is being properly worn, signalling means responsive to the sensor means for actively generating an electromagnetic signal indicating that the protective garment is being properly worn and means for modulating the signal at a modulation frequency selected to identify a specific protective garment which may be used in close proximity to other protective garments, the system further comprising at least one sensor separate from the protective garment and responsive to positional change relative to the dangerous condition for arming an alarm and for simultaneously activating a detection and control means, said detection and control means responsive to the modulated signal from the signalling means and operatively associated with the alarm for triggering the armed alarm only when the detection and control means does not detect the presence of the modulated signal, and means for preventing, for a preselected time delay, the detection and control means from triggering the armed alarm following interruption of detecting the signal.

20. A system according to claim 19, wherein the dangerous condition results from a hazardous environment and the sensor senses positional change toward the hazardous environment.

21. A system according to claim 20, wherein the sensor responsive to positional change comprises a magnetic field generator/receiver.

22. A system according to claim 21, further comprising magnetic means on said protective garment for interacting with said magnetic field generator/receiver.

23. An interactive protective system to protect an individual from exposure to a dangerous condition, comprising a protective garment adapted to be worn by the individual, the protective garment including sensor and proximity means for sensing when the protective garment is being properly worn in a proximity to the individual's body which is consistent with proper employment of the garment, signalling means responsive to the sensor and proximity means for actively generating an electromagnetic signal indicating that the protective garment is being worn in a manner consistent with proper employment and means for modulating the signal at a modulation frequency selected to identify a specific protective garment, the system further comprising at least one directional motion sensor separate from the protective garment and responsive to positional change relative to the dangerous condition for arming an alarm and for simultaneously activating a detection and control means responsive to the modulated signal from the signalling means and operatively associated with the alarm for triggering the armed alarm only when the detection and control means does not detect the presence of the modulated signal, and means for preventing, for a preselected time delay, the detection and control means from triggering the armed alarm following interruption of detecting the signal.

24. A system according to claim 23, wherein the dangerous condition results from a hazardous environment and the sensor senses positional change toward the hazardous environment.

25. A system according to claim 23, wherein the sensor responsive to positional change comprises a magnetic field generator/receiver.

26. A system according to claim 25, further comprising magnetic means on said protective garment for interacting with said magnetic field generator/receiver.

* * * * *

UNITED STATES PATENT AND TRADEMARK OFFICE
CERTIFICATE OF CORRECTION

PATENT NO. : 5,315,289
DATED : May 24, 1994
INVENTOR(S) : Terry A. Fuller and Thomas Jennings It is certified that error appears in the above-indentified patent and that said Letters Patent is hereby corrected as shown below:

Please correct Figure 9 on the line connecting item "40" to item "42", please add the callout --C--.

Signed and Sealed this

Twenty-seventh Day of September, 1994

Attest:

BRUCE LEHMAN

Attesting Officer

Commissioner of Patents and Trademarks